(12) United States Patent
Hu

(10) Patent No.: US 9,835,350 B2
(45) Date of Patent: Dec. 5, 2017

(54) METHOD FOR CONTROLLING CONSTANT AIR VOLUME OF ECM MOTOR IN HVAC SYSTEM

(71) Applicant: Zhongshan Broad-Ocean Motor Co., Ltd., Zhongshan (CN)

(72) Inventor: Ge Hu, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 192 days.

(21) Appl. No.: 14/987,694

(22) Filed: Jan. 4, 2016

(65) Prior Publication Data

US 2016/0116180 A1   Apr. 28, 2016

Related U.S. Application Data

(63) Continuation-in-part of application No. PCT/CN2014/070588, filed on Jan. 14, 2014.

(51) Int. Cl.
*F24F 11/00* (2006.01)
*F24F 11/047* (2006.01)
(Continued)

(52) U.S. Cl.
CPC ............ *F24F 11/006* (2013.01); *F24F 3/048* (2013.01); *F24F 11/0079* (2013.01);
(Continued)

(58) Field of Classification Search
None
See application file for complete search history.

(56) References Cited

U.S. PATENT DOCUMENTS

2010/0211223 A1* 8/2010 Ikeda ............... F24F 11/0079
700/276
2011/0146651 A1* 6/2011 Puranen ............... F24D 5/04
126/116 A
(Continued)

*Primary Examiner* — Dennis M Butler
(74) *Attorney, Agent, or Firm* — Matthias Scholl, PC; Matthias Scholl

(57) ABSTRACT

A method for controlling constant air volume of an ECM motor in an HVAC system. The method includes: a) acquiring a target air volume $Q_{set}$ input from an external, determining a function $I_{tad}=f(n)$ corresponding to the target air volume $Q_{set}$ by the microprocessor, in which $I_{tad}$ represents a bus current, n represents a rotational speed of the motor; b) acquiring a calculated bus current $I_{tad}$ according to the rotational speed n and the function $I_{tad}=f(n)$, and detecting a real-time bus current $I_{bus}$; and c) comparing the calculated bus current $I_{tad}$ with the real-time bus current $I_{bus}$ by the microprocessor for closed-loop control; when $I_{tad}>I_{bus}$, increasing the rotational speed n of the motor; when $I_{tad}<I_{bus}$, decreasing the rotational speed n of the motor; and when $I_{tad}=I_{bus}$, stopping regulating the rotational speed n and returning to B) for continuing the control of the constant air volume.

18 Claims, 8 Drawing Sheets

(51) Int. Cl.
*F24F 3/048* (2006.01)
*G05B 15/02* (2006.01)

(52) U.S. Cl.
CPC ............ F24F 11/047 (2013.01); G05B 15/02 (2013.01); *Y02B 30/746* (2013.01)

(56) References Cited

U.S. PATENT DOCUMENTS

2012/0009863 A1* 1/2012 Sun ........................... H02P 6/06
 454/228
2013/0320889 A1* 12/2013 Zhang .................... H02K 21/14
 318/400.02
2014/0077738 A1* 3/2014 Iwaji ....................... H02P 27/08
 318/400.36

* cited by examiner

METHOD FOR CONTROLLING CONSTANT AIR VOLUME OF ECM MOTOR IN HVAC SYSTEM

CROSS-REFERENCE TO RELATED APPLICATIONS

This application is a continuation-in-part of International Patent Application No. PCT/CN2014/070588 with an international filing date of Jan. 14, 2014, designating the United States, now pending, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to a method for controlling constant air volume of an electronically commutated motor (ECM motor) in a heating, ventilating, and air conditioning (HVAC) system.

Description of the Related Art

Typically, an air flowmeter is directly installed in the air duct of the air conditioning system to obtain constant air volume. The method increases the production cost and the air flowmeter often malfunctions, thus causing control failure. Other methods for controlling the constant air volume require monitoring the static pressure of the system to adjust the rotational speed, or require strong computing capacity of the MCU of the motor controller, all of which increase the production cost.

SUMMARY OF THE INVENTION

In view of the above-described problems, it is one objective of the invention to provide a method for controlling constant air volume of an ECM motor in an HVAC system. The method of the invention employs simple mathematical model and involves simple algorithms. The computation capacity of the CPU is not highly required, thus the production cost is reduced. The control accuracy is high, and the purpose of controlling low air volume can be realized by controlling the rotational speed.

To achieve the above objective, in accordance with one embodiment of the invention, there is provided a method for controlling constant air volume of an ECM motor in an HVAC system. The ECM motor drives the wind wheel and comprises: a stator assembly, a rotor assembly, and a motor controller. The motor controller comprises: a power circuit, a microprocessor, an inverter circuit, a rotor position detection circuit, and a bus current detection circuit. The power circuit supplies power to other circuits. The rotor position detection circuit detects a rotor position signal and inputs the rotor position signal to the microprocessor. The microprocessor calculates a real-time rotational speed n according to the rotor position signal. The bus current detection circuit inputs a bus current to the microprocessor. The microprocessor controls the inverter circuit. The inverter circuit controls an energization state of each coil winding of the stator assembly. The method comprises:

A) acquiring a target air volume $Q_{set}$ input from an external, determining a function $I_{tad}=f(n)$ corresponding to the input target air volume $Q_{set}$ by the microprocessor, in which, $I_{tad}$ represents a bus current, n represents a rotational speed of the motor, $n_{min}<n<n_{max}$, $n_{min}$ represents a minimum critical rotational speed of the function $I_{tad}=f(n)$ corresponding to the input target air volume, $n_{max}$ represents a maximum critical rotational speed of the function $I_{tad}=f(n)$ corresponding to the input target air volume; when the motor is in a halt state, operating the motor and acquiring an original rotational speed n of the motor by the microprocessor; and when the motor is in an operating state, acquiring a current rotational speed n of the motor by the microprocessor;

B) acquiring a calculated bus current $I_{tad}$ according to the rotational speed n of the motor and the function $I_{tad}=f(n)$, and detecting a real-time bus current $I_{bus}$; and C) comparing the calculated bus current $I_{tad}$ with the real-time bus current $I_{bus}$ by the microprocessor for closed-loop control; when the calculated bus current $I_{tad}$ is larger than the real-time bus current $I_{bus}$, increasing the rotational speed n of the motor; when the calculated bus current $I_{tad}$ is smaller than the real-time bus current $I_{bus}$, decreasing the rotational speed n of the motor; and when the calculated bus current $I_{tad}$ is equal to the real-time bus current $I_{bus}$, stopping regulating the rotational speed n of the motor and allowing the ECM motor to enter a working condition, and returning to B) for continuing the control of the constant air volume.

In a class of this embodiment, the method further comprises determining whether the rotational speed is within the range of between $n_{min}$ and $n_{max}$ before regulating the rotational speed of the motor in C), and employing a critical rotational speed as a next rotational speed and repeating B) and C) when the rotational speed is out of the range of between $n_{min}$ and $n_{max}$.

In a class of this embodiment, "when the calculated bus current $I_{tad}$ is equal to the real-time bus current $I_{bus}$" means that an error of the real-time bus current $I_{bus}$ deviated from the calculated bus current $I_{tad}$ is within a certain range. The error is within a certain range means that a deviation is ±3%.

In a class of this embodiment, the function $I_{tad}=f(n)$ is acquired as follows: for each target air volume, gradually increasing a static pressure within a range covering an actual static pressure range while allowing the motor to be in a constant rotational speed control; regulating a rotational speed of a back pressure fan in an air duct or an opening of an air door for ensuring the real-time air volume equal to the target air volume, and recording the rotational speed n of the motor in a stable state and the DC bus current $I_{tad}$ so that a group of the rotational speed n and the DC bus current $I_{tad}$ are obtained corresponding to each target air volume; and acquiring the function $I_{tad}=f(n)$ corresponding to each target air volume by curve fitting.

In a class of this embodiment, the function $I_{tad}=f(n)$ is a polynomial function: $I_{tad}=C_1+C_2 \times n+ \ldots +C_m \times n^{m-1}$, in which $C_1, C_2, \ldots,$ and $C_m$ represent coefficients, n represents the rotational speed of the motor; each target air volume corresponds to one group of coefficients $C_1, C_2, \ldots,$ and $C_m$ and the corresponding coefficients are stored. One group of coefficients $C_1, C_2, \ldots,$ and $C_m$ are acquired by the microprocessor by a look-up table method according to the input target air volume $Q_{set}$, whereby acquiring the function $I_{tad}=f(n)$.

In a class of this embodiment, in acquiring the target air volume $Q_{set}$ input from the external in A), when the motor is in the halt state, the original rotational speed n of the motor is an intermediate value in a normal rotational speed range of the motor.

In a class of this embodiment, each target air volume $Q_{set}$ input from the external corresponds to a certain range of a duty ratio of a PWM signal input from the external, a relay signal, a digital communication signal, or a signal similar to a 0-10 VAC analog signal.

In a class of this embodiment, increasing or decreasing the rotational speed n of the motor is realized by increasing or decreasing a duty ratio of a PWM signal input into the inverter circuit by the microprocessor.

In a class of this embodiment, the microprocessor is stored with four grades of air volumes corresponding to four functions $I_{tad}=f(n)$. A first target air volume Q1, a second target air volume Q2, a third target air volume Q3, and a fourth target air volume Q4 respectively correspond to a lower air volume control, a middle lower air volume control, a middle air volume control, and a higher air volume control. The signal of the target air volume $Q_{set}$ input from the external is the PWM signal. The first target air volume Q1 is selected when the duty ratio of the PWM signal is between 1% and 25%. The second target air volume Q2 is selected when the duty ratio of the PWM signal is between 26% and 50%. The third target air volume Q3 is selected when the duty ratio of the PWM signal is between 51% and 75%. The fourth target air volume Q4 is selected when the duty ratio of the PWM signal is between 76% and 99%. Similarly, the signal of the target air volume $Q_{set}$ input from the external can also adopt output voltages of four relays to select one of four target air volumes, or adopt the digital communication protocol to select one of the four target air volumes, or adopt the 0-10 VDC analog signal for selection. The first target air volume Q1 is selected when the voltage is [0, 2.5) V, the second target air volume Q2 is selected when the voltage is [2.5, 5) V, the third target air volume Q3 is selected when the voltage is [5, 7.5) V, and the fourth target air volume Q4 is selected when the voltage is [7.5, 10] V.

Advantages of the method for controlling constant air volume of an electronically commutated motor (ECM motor) in a heating, ventilating, and air conditioning (HVAC) system according to embodiments of the invention are summarized as follows.

1) The function $I_{tad}=f(n)$ of the DC bus current related to each target air volume $Q_{set}$ is acquired by experimental means, and the calculated DC bus current $I_{tad}$ is obtained by the microprocessor according to the function $I_{tad}=f(n)$ and the corresponding target air volume $Q_{set}$. The real-time DC bus current $I_{bus}$ is detected, and the calculated DC bus current $I_{tad}$ and the real-time DC bus current $I_{bus}$ are compared for the close-loop control.

2) The number of the control variables is small, the mathematical model is simple. It is not necessary to calculate or control a real-time torque of the motor, and the microprocessors, such as CPU and MCU, the computing capacity of which are not so high can be Adopted, therefore decreasing the cost of the product.

3) The specific measurements by the closed-loop control and the experimental means are able to effectively ensure the accuracy of the control and to realize the small air volume control free from the limiting state of the minimum torque.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a method for controlling constant air volume of an ECM motor in an HVAC system are described below. It should be noted that the following examples are intended to describe and not to limit the invention.

Figure 1:
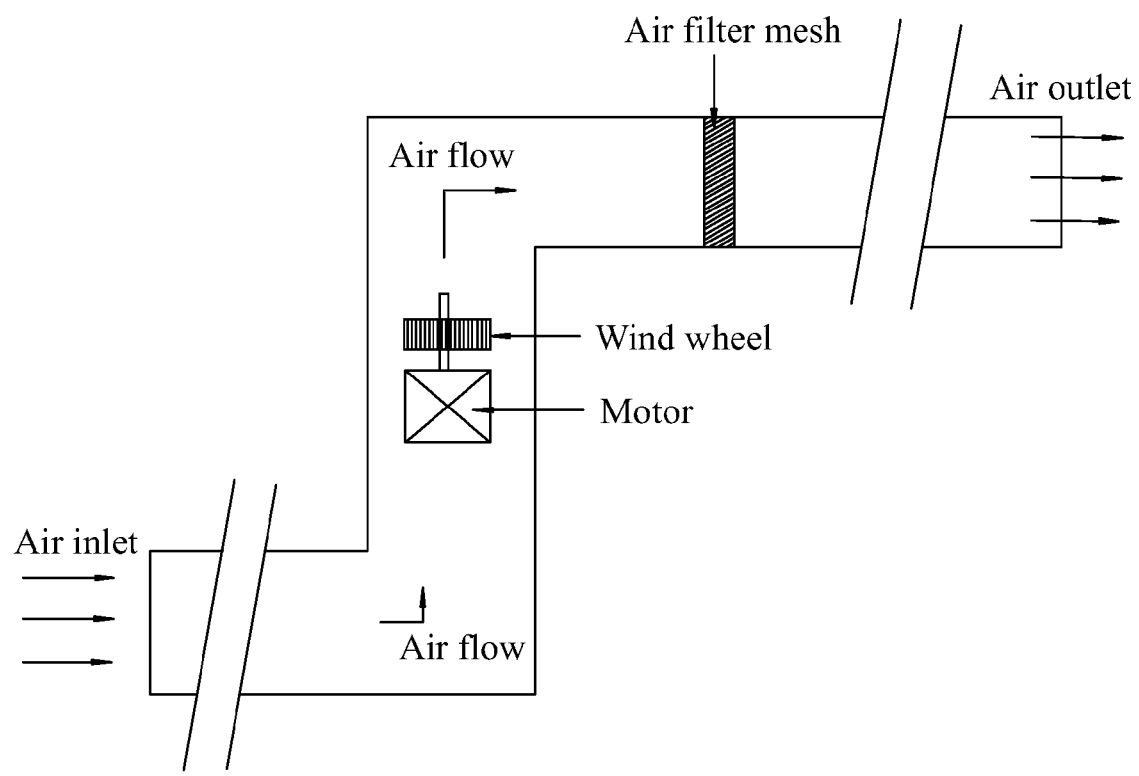
FIG. 1 is a structure diagram of a conventional air conditioning system.

As shown in FIG. 1, a blower system (e.g., a gas furnace or an air processor, which are replaced with "motor+wind wheel" in the figure) is installed in a typical air-conditioning ventilation duct. An air filter is arranged in the duct. The motor is started to blast the air. The number of air outlets and air inlets is related to the number of rooms, and there is no unified standard to design ducts. Meanwhile, the filter may have different pressure drops, and the blower system carrying a traditional single-phase AC motor (PSC motor) is positioned in a different duct, thus the actual air volume will be different.

Figure 2:
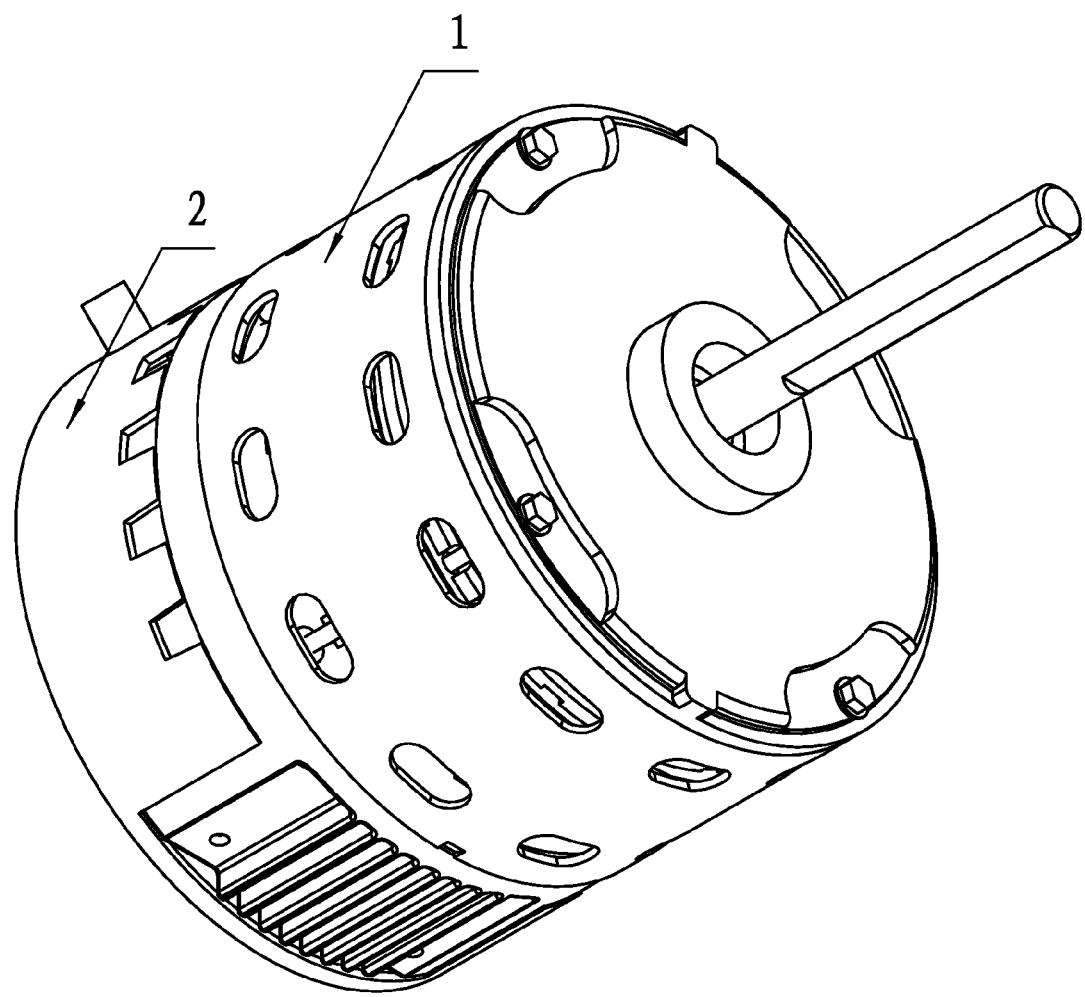
FIG. 2 is a stereogram of an ECM motor in accordance with one embodiment of the invention.
Figure 3:
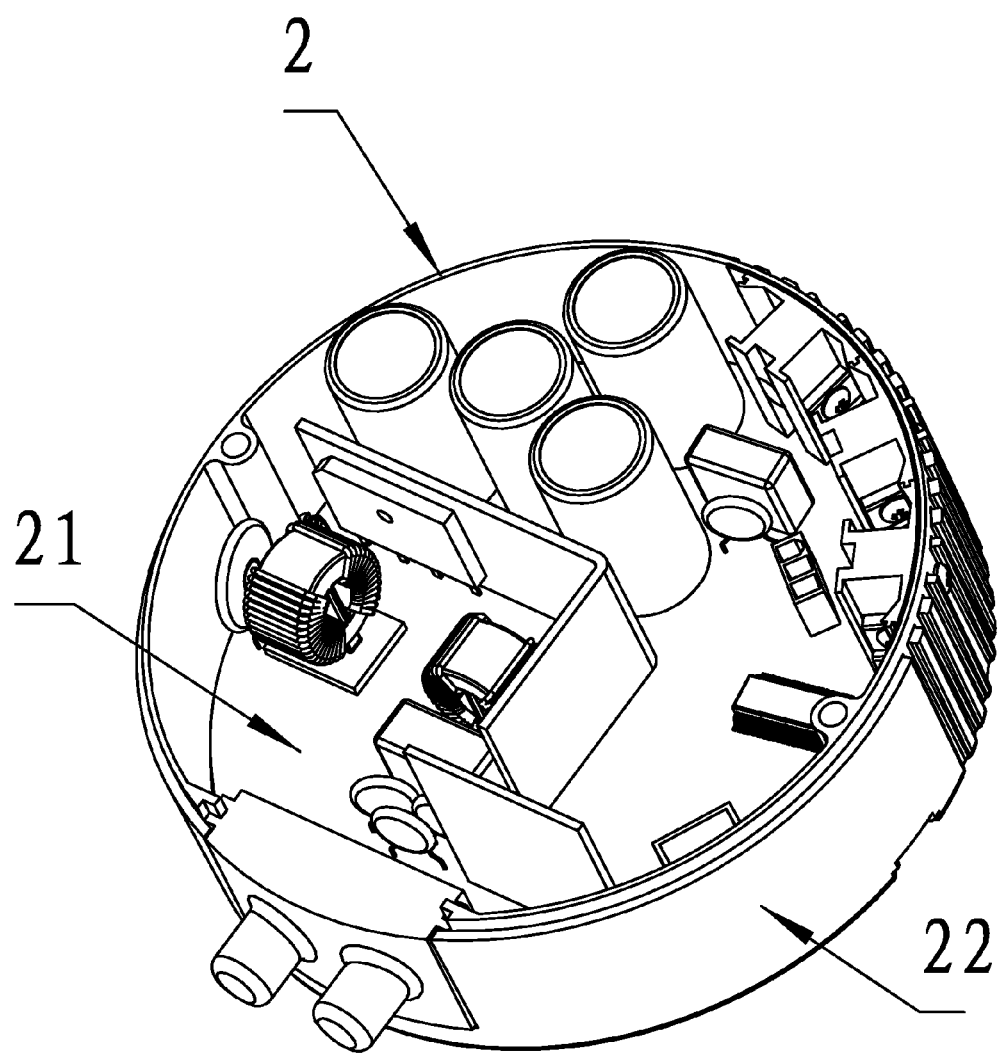
FIG. 3 is a stereogram of a motor controller of an ECM motor in accordance with one embodiment of the invention.
Figure 4:
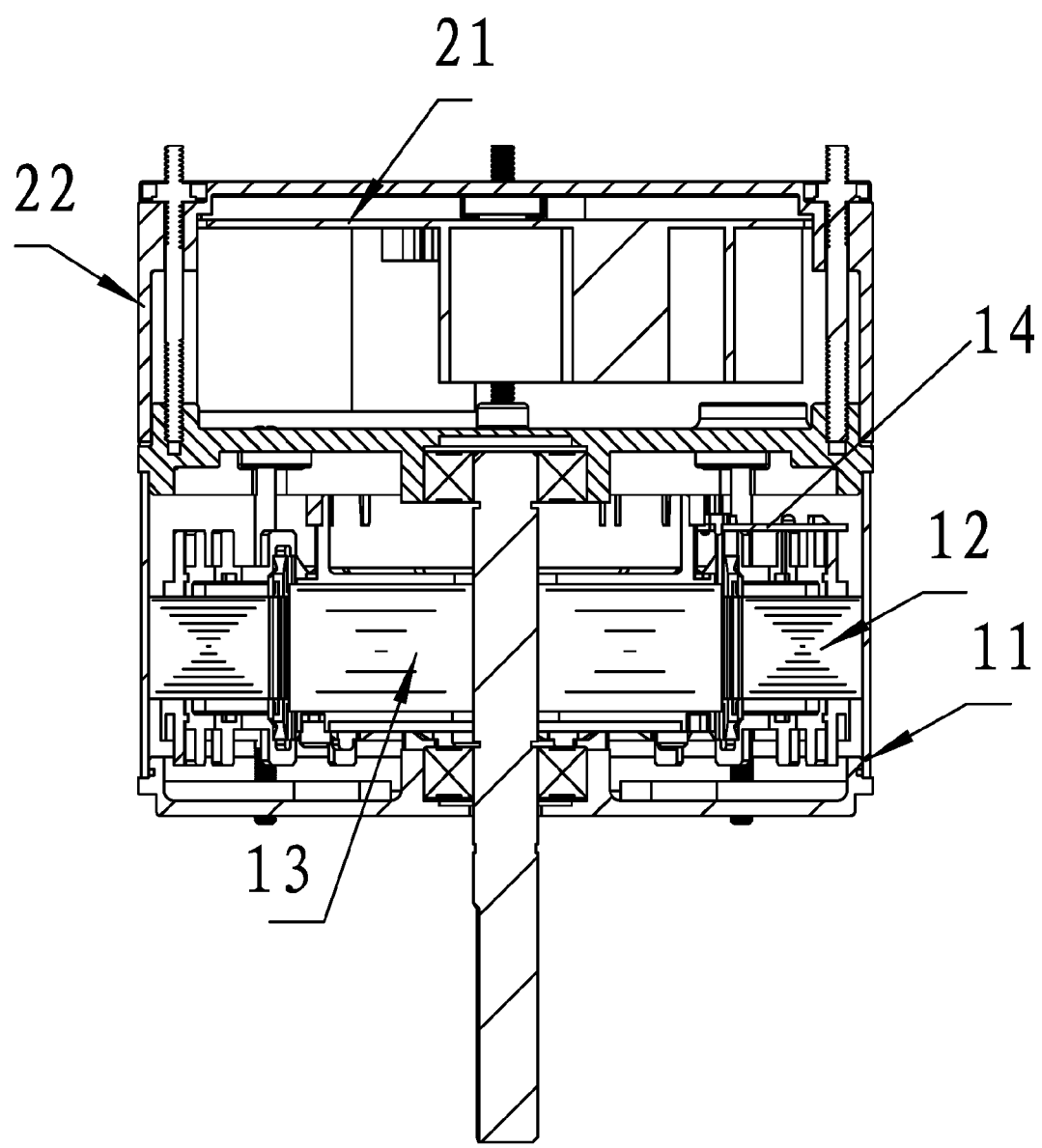
FIG. 4 is a cross sectional view of an ECM motor in accordance with one embodiment of the invention.

As shown in FIGS. 2-4, an ECM motor generally comprising a motor controller 2 and a motor body 1. The motor body 1 comprises a stator assembly 12, a rotor assembly 13, and a housing assembly 11. The stator assembly 12 is mounted on the housing assembly 11. The motor body 1 is provided with a Hall sensor 14 for detecting a rotor position. The stator assembly 13 is nested inside or outside the stator assembly 12. The motor controller 2 comprises a control box 22 and a control board 21 disposed inside the control box 22. The control board 21 generally comprises a power supply circuit, a microprocessor, a bus current detection circuit, an inverter circuit, and a rotor position measuring circuit 14 (i.e., the Hall sensor). The power supply circuit supplies power to each part of circuit. The rotor position measuring circuit detects a rotor position signal and inputs the rotor position to the microprocessor. The bus current detection circuit detects a bus current into the microprocessor. The microprocessor controls the inverter circuit. The inverter circuit controls an energization state of each coil winding of the stator assembly 12.

Figure 5:
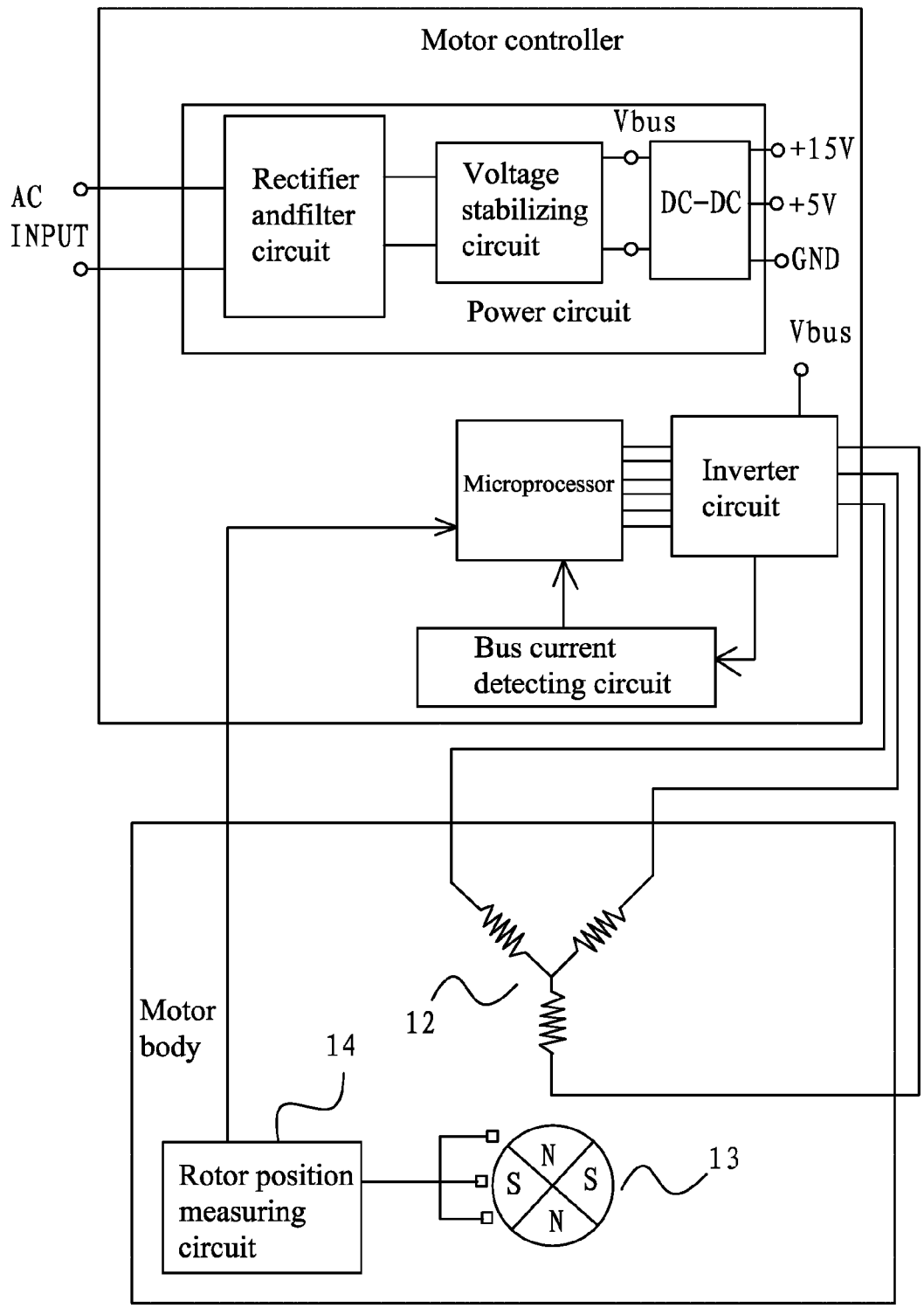
FIG. 5 is a circuit block diagram of a motor controller of an ECM motor in accordance with one embodiment of the invention.
Figure 6:
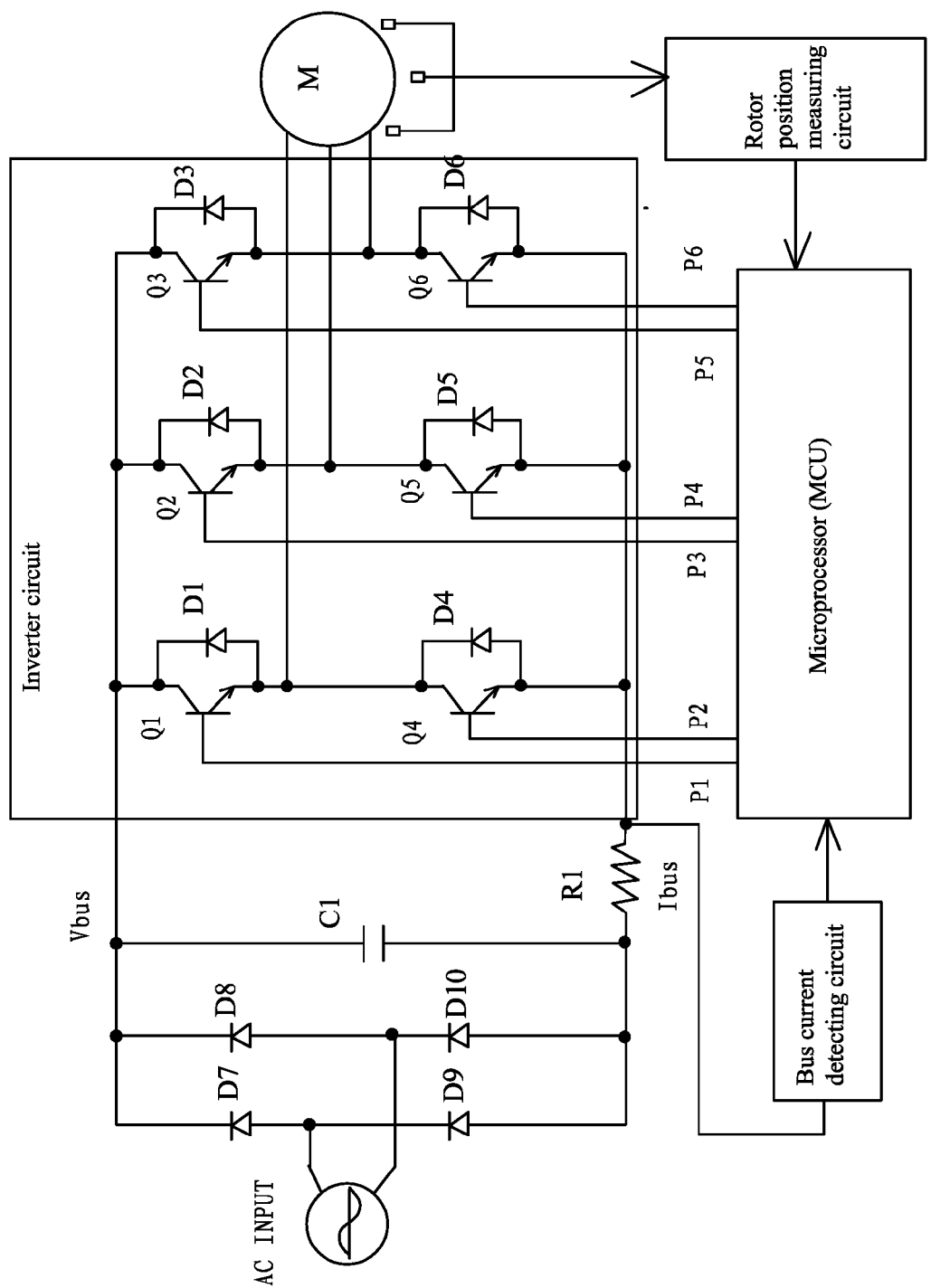
FIG. 6 is a circuit diagram corresponding to FIG. 5.

As shown in FIGS. 5-6, given that an ECM motor is a three-phase brushless DC permanent magnetic synchronous motor, the rotor position detection circuit 14 generally adopts three Hall sensors. Each of the three Hall sensors respectively detects a rotor position in a 360° electric angle cycle, and the energization state of each phase of the coil winding of the stator assembly changes when the electric angle changes for every 120° electric angle, thereby forming the three-phase six-step control mode. An AC input passes a full wave commutate circuit formed by diodes D7, D8, D9, and D10 and outputs a DC bus voltage Vbus at a terminal of a capacitance C1. The DC bus voltage Vbus is related to an input AC voltage, and when a voltage of the AC input is determined, the DC bus voltage Vbus is constant, and a line voltage P of the three-phase winding is a PWM chopped output voltage, P=Vbus*w, in which, w represents a duty ratio of the PWM signal input into the inverter circuit by the microprocessor. The line voltage UP can be changed by changing the DC bus current Ibus. The inverter circuit is formed by electronic switching tubes Q1, Q2, Q3, Q4, Q5, and Q6, and control terminals of the electronic switching tubes Q1, Q2, Q3, Q4, Q5, and Q6 are controlled by six paths of PWM signals (P1, P2, P3, P4, P5, and P6) output by the microprocessor. The inverter circuit is further connected to a resistance R1 for detecting the bus current Ibus, and the bus current Ibus detected by the resistance R1 is converted by the bus current detecting circuit and transmitted to the microprocessor.

Figure 7:
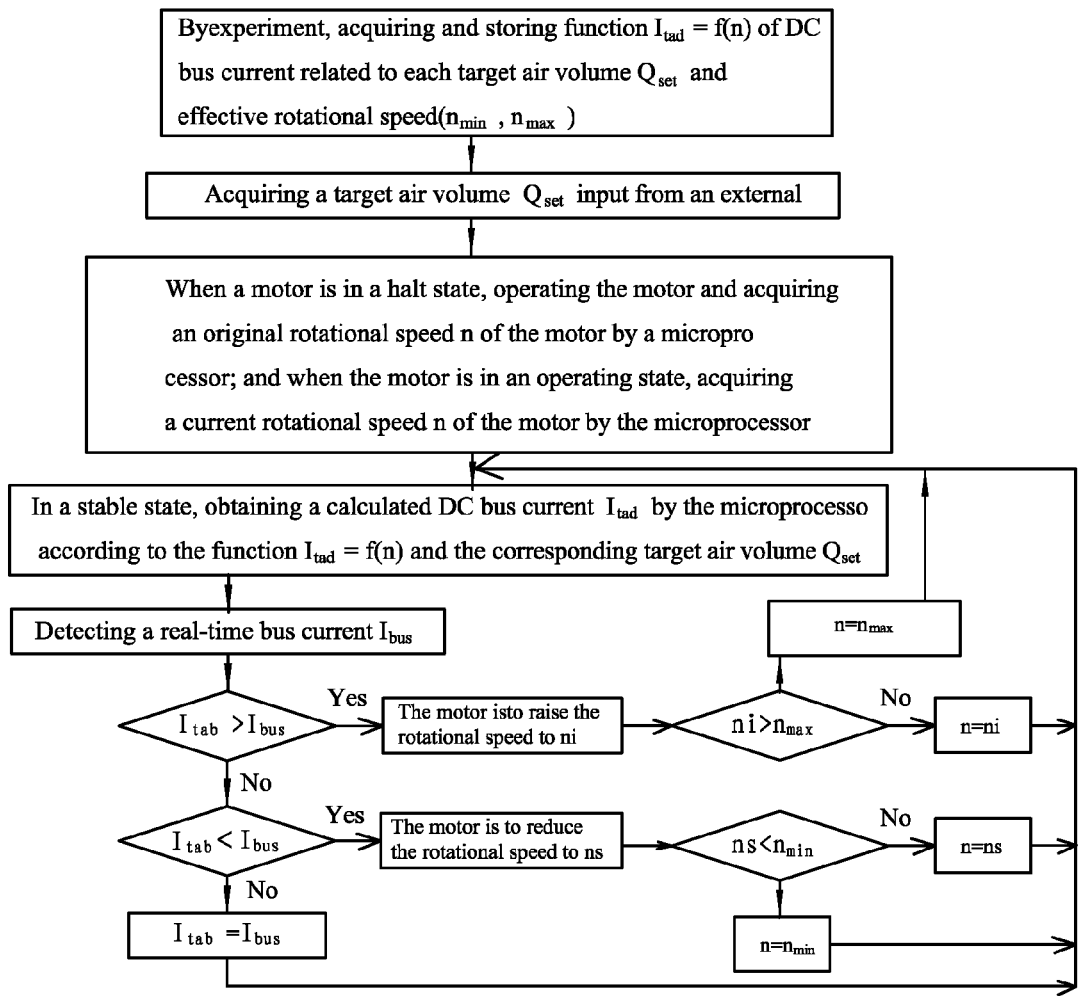
FIG. 7 is a flow chart illustrating a method for controlling constant air volume in accordance with one embodiment of the invention.

As shown in FIG. 7, a method for controlling constant air volume of an ECM motor in an HVAC system is illustrated. The ECM motor drives the wind wheel and comprises: a stator assembly, a rotor assembly, and a motor controller. The motor controller comprises: a power circuit, a microprocessor, an inverter circuit, a rotor position detection circuit, and a bus current detection circuit. The power circuit supplies power to other circuits. The rotor position detection circuit detects a rotor position signal and inputs the rotor position signal to the microprocessor. The microprocessor calculates a real-time rotational speed n according to the rotor position signal. The bus current detection circuit inputs a bus current to the microprocessor. The microprocessor controls the inverter circuit. The inverter circuit controls an energization state of each coil winding of the stator assembly. The method for constant air volume control comprises the following steps:

A) acquiring a target air volume $Q_{set}$ input from an external, determining a function $I_{tad}=f(n)$ corresponding to the input target air volume $Q_{set}$ by the microprocessor, in which, $I_{tad}$ represents a bus current, n represents a rotational speed of the motor, $n_{min}<n<n_{max}$, $n_{min}$ represents a lowest critical rotational speed of the function $I_{tad}=f(n)$ corresponding to the input target air volume, $n_{max}$ represents a highest critical rotational speed of the function $I_{tad}=f(n)$ corresponding to the input target air volume; when the motor is in a halt state, operating the motor and acquiring an original rotational speed n of the motor by the microprocessor; and when the motor is in an operating state, acquiring a current rotational speed n of the motor by the microprocessor;

B) allowing the motor to operate in a stable state, acquiring a calculated bus current $I_{tad}$ according to the rotational speed n of the motor and the function $I_{tad}=f(n)$, and detecting a real-time bus current $I_{bus}$;

C) comparing the calculated bus current $I_{tad}$ with the real-time bus current $I_{bus}$ by the microprocessor for closed-loop control; when the calculated bus current $I_{tad}$ is larger than the real-time bus current $I_{bus}$ increasing the rotational speed n of the motor; when the calculated bus current $I_{tad}$ is smaller than the real-time bus current $I_{bus}$, decreasing the rotational speed n of the motor; and when the calculated bus current $I_{tad}$ is equal to the real-time bus current $I_{bus}$, stopping regulating the rotational speed n of the motor and allowing the ECM motor to enter a working condition, and returning to B) for continuing the control of the constant air volume.

Figure 8:
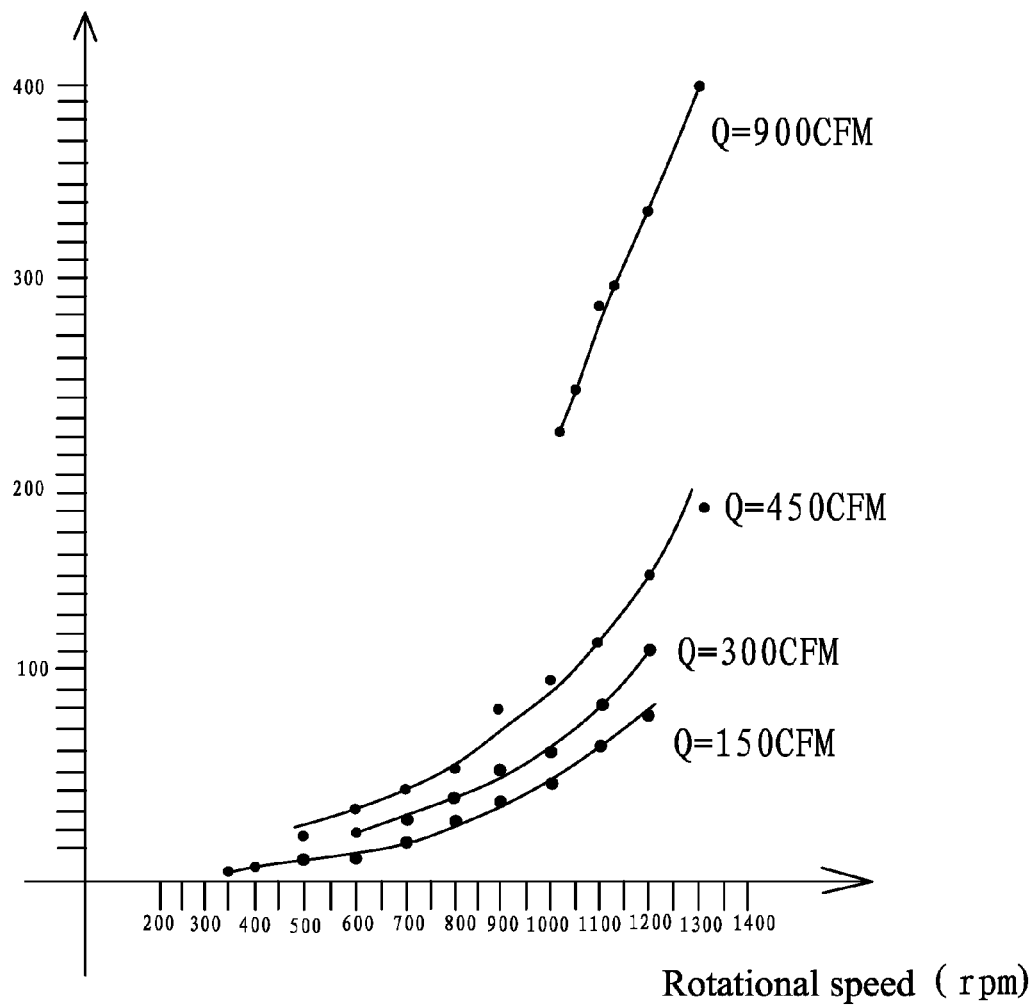
FIG. 8 shows fitting curves of constant air volumes obtained from experiment data in accordance with one embodiment of the invention.

Before regulating the rotational speed of the motor in C), it can be determined whether the rotational speed is within a range of between $n_{min}$ and $n_{max}$. when the rotational speed is out of the above range, a critical rotational speed is employed as a next rotational speed and B) and C) are repeated, as shown in FIG. 8, specifically, when the motor is to raise the rotational speed to ni, it is determined whether ni is larger than $n_{max}$; if ni is larger than the maximum critical rotational speed $n_{max}$, let the rotational speed of the motor n=$n_{max}$; if ni is smaller than $n_{max}$, let the rotational speed n=ni. When the motor is to reduce the rotational speed to ns, it is determined whether ns is smaller than $n_{min}$; if ns is smaller than the minimum critical rotational speed $n_{min}$, let the rotational speed n=$n_{min}$, and if ns is larger than the minimum critical rotational speed $n_{min}$, let the rotational speed n=ns.

"When the calculated bus current $I_{tad}$ is equal to the real-time bus current $I_{bus}$" means that an error of the real-time bus current $I_{bus}$ deviated from the calculated bus current $I_{tad}$ is within a certain range. The error is within a certain range means that a deviation is ±3%.

The function $I_{tad}=f(n)$ is acquired as follows: for each target air volume, gradually increasing a static pressure within a range covering an actual static pressure range while allowing the motor to be in a constant rotational speed control; regulating a rotational speed of a back pressure fan in an air duct or an opening of an air door for ensuring the real-time air volume equal to the target air volume, and recording the rotational speed n of the motor in a stable state and the DC bus current $I_{tad}$ so that a group of the rotational speed n and the DC bus current $I_{tad}$ are obtained corresponding to each target air volume; and acquiring the function $I_{tad}=f(n)$ corresponding to each target air volume by curve fitting.

The function $I_{tad}=f(n)$ is acquired as follows: given that a range of the rotational speed n of the ECM motor is between 300 RPM and 1400 RPM, multiple target air volumes $Q_{set}$ are to be controlled, a first target air volume Q1 is 150 SCFM and a required static pressure is between 0.1 and 0.9 inch of a water column, a second target air volume Q2 is 200 SCFM and the required static pressure is between 0.1 and 0.8 inch of the water column, and a third target air volume Q3 is 250 SCFM and the required static pressure is between 0.1 and 0.6 inch of the water column.

The rotational speed n of the ECM motor is controlled at a first rotational speed, such as 300 RPM, the rotational speed of the back pressure fan in the air duct or the opening of the air door is regulated to maintain the first target air volume Q1 at 150 SCFM, data to be collected, such as the rotational speed n of the motor, the DC bus current $I_{tad}$ of the motor, and the external static pressure P of the load, are recorded, and the external static pressure P is enabled to be smaller than or equal to the required maximum static pressure of 0.1 inch of the water column.

The rotational speed n of the ECM motor is controlled to be the next rotational speed, such as 400 RPM, and the air volume is controlled to be the first target air volume Q1 of 150 SCFM by regulating the rotational speed of the back pressure fan in the air duct or the opening of the air door, data to be collected, such as the rotational speed n of the motor, the DC bus current $I_{tad}$, and the external static pressure P of the load, are read.

The rotational speed is increased with a certain step length, such as 100 RPM, to repeat the above step until the rotational speed n of the motor is large enough to produce an external static pressure that is larger than or equal to the required maximum external static pressure, for example, when the rotational speed reaches 1300 RPM and the external static pressure P is 0.95 inch of the water column, the air volume is maintained to be the first target air volume Q1 of 150 SCFM by regulating the rotational speed of the back pressure fan in the air duct or the opening of the air door, data to be collected, such as the rotational speed n of the motor, the DC bus current $I_{tad}$, and the external static pressure P of the load, are read.

Thus, the data collection corresponding to the first target air volume of 150 SCFM is realized.

Data collection corresponding to the second target air volume Q2 of 200 SCFM is similar to the above step, whereas at each required rotational speed of the ECM motor, the rotational speed of the back pressure fan in the air duct or the opening of the air door is regulated to maintain the air volume to be 200 SCFM. Data required to be collected, including the rotational speed n of the motor, the DC bus current Idc of the motor, and the external static pressure P of the load, are read. It should be noted that the external static pressure P corresponding to the first rotational speed is smaller than or equal to 0.1 inch of the water column, and the external static pressure P corresponding to the last rotational speed is larger than or equal to 0.8 inch of the water column.

For data collection corresponding to the third target air volume Q3 of 250 SCFM, the fourth target air volume Q4, and the target air volume Q5, etc., is similar to the above step, and the function $I_{tad}=f(n)$ corresponding to each target air volume $Q_{set}$ is obtained by curve fitting.

As shown in FIG. 8, for each target air volume, a group of the rotational speed n and the DC bus current $I_{tad}$ are produced, and the corresponding function $I_{tad}=f(n)$ is produced by curve fitting. In real-time control, when a certain target air volume is received by the motor, the corresponding function $I_{tad}=f(n)$ is selected, a difference between the real-time bus current $I_{bus}$ and the calculated bus current $I_{tad}$ acquired from the function are compared. The rotational speed of the motor is then regulated by the difference via the ratio and the integral coefficient until that the rotational speed n of the motor and the real-time bus current $I_{bus}$ fall on the curve. Thus, the system reaches the target air volume, the process of the curve fitting is selecting the polynomial curve, and the coefficient of the polynomial can be calculated by the least square method. Theoretically, $I_{tad}=C_1+C_2\times n+C_3\times n^2+ \ldots +Cm\times n^{m-1}$, actually the selection of the binomial is able to satisfy the general requirement.

The function relation $I_{tad}=f(n)$ is a second-order function: $I_{tad}=C_1+C_2\times n+C_3\times n^2$, in which $C_1$, $C_2$, and $C_3$ represents coefficients, n represents the rotational speed of the motor. Each target air volume corresponds to one group of coefficients $C_1$, $C_2$, and $C_3$ and the group of the coefficients are stored. One group of coefficients $C_1$, $C_2$, . . . , and $C_m$ are acquired by the microprocessor by a look-up table method according to the input target air volume $Q_{set}$ so as to acquire the function $I_{tad}=f(n)$. The group of the coefficients $C_1$, $C_2$, and $C_3$ corresponding to each target air volume of a certain load are specifically as shown in Table 1:

TABLE 1

| $Q_{set}$ | $C_1$ | $C_2$ | $C_3$ |
|---|---|---|---|
| 150 | 27.83 | −10.89 | 1.274 |
| 200 | . . . | . . . | . . . |
| 250 | . . . | . . . | . . . |
| 300 | . . . | . . . | . . . |
| 350 | . . . | . . . | . . . |
| 400 | . . . | . . . | . . . |
| . . . | . . . | . . . | . . . |
| 900 | −669.8 | 110 | −2.16 |

In acquiring the target air volume $Q_{set}$ input from the external in A), when the motor is in the halt state, the original rotational speed n of the motor is within a range of between 400 RPM and 1300 RPM.

Each target air volume $Q_{set}$ input from the external corresponds to a certain range of a duty ratio of a PWM signal input from the external, a relay signal, a digital communication signal, or a signal similar to a 0-10 VAC analog signal.

Increasing or decreasing the rotational speed n of the motor is realized by increasing or decreasing a duty ratio of a PWM signal input into the inverter circuit by the microprocessor.

Specific process for carrying out the embodiment: currently, four grades of air volumes are configured in a certain commercial air conditioner, a lower air volume control, a middle lower air volume control, the middle air volume control, and the higher air volume control. Given that the four grades of air volumes respectively correspond to Q1=150 CFM, Q2=300 CFM, Q3=450 CFM, and Q4=900 CFM. The signal of the target air volume $Q_{set}$ input from the external is the PWM signal. The first target air volume Q1 is selected when the duty ratio of the PWM signal is between 1% and 25%. The second target air volume Q2 is selected when the duty ratio of the PWM signal is between 26% and 50%. The third target air volume Q3 is selected when the duty ratio of the PWM signal is between 51% and 75%. The fourth target air volume Q4 is selected when the duty ratio of the PWM signal is between 76% and 99%. Similarly, the signal of the target air volume $Q_{set}$ input from the external can also adopt output voltages of four relays to select one of four target air volumes, or adopt the digital communication protocol to select one of the four target air volumes, or adopt the 0-10 VDC analog signal for selection. The first target air volume Q1 is selected when the voltage is [0, 2.5) V, the second target air volume Q2 is selected when the voltage is [2.5, 5) V, the third target air volume Q3 is selected when the voltage is [5, 7.5) V, and the fourth target air volume Q4 is selected when the voltage is [7.5, 10] V.

Preparation phase of the experiment: the rotational speed n of the ECM motor is controlled at 300 RPM, the first target air volume Q1 is maintained at 150 SCFM by regulating the rotational speed of the back pressure fan in the air duct and the opening of the air door, and the range of the static pressure P is between 0.1 and 0.9 inch of the water column. The data required to be collected, including the rotational speed n of the motor, the DC bus current $I_{tad}$ of the motor, and the external static pressure P of the load, are recorded.

The second target air volume Q2 is configured to be 300 SCFM, the range of the static pressure is between 0.1 and 0.8 inch of the water column. The air volume is maintained at Q2=300 SCFM by regulating the rotational speed of the back pressure fan in the air duct and the opening of the air door. The data required to be collected, including the rotational speed n of the motor, the DC bus current $I_{tad}$ of the motor, and the external static pressure P of the load, are recorded.

The third target air volume Q3 is configured to be 450 SCFM, the range of the static pressure is between 0.1 and 0.7 inch of the water column. The air volume is maintained at Q3=450 SCFM by regulating the rotational speed of the back pressure fan in the air duct and the opening of the air door. The data required to be collected, including the rotational speed n of the motor, the DC bus current $I_{tad}$ of the motor, and the external static pressure P of the load, are recorded.

The fourth target air volume Q4 is configured to be 900 SCFM, the range of the static pressure is between 0.1 and 0.5 inch of the water column. The air volume is maintained at Q4=900 SCFM by regulating the rotational speed of the back pressure fan in the air duct and the opening of the air door. The data required to be collected, including the rotational speed n of the motor, the DC bus current $I_{tad}$ of the motor, and the external static pressure P of the load, are recorded. Experiment data are shown in Table 2.

TABLE 2

| Measured air volume SCFM | Measured rotational speed RPM | Measured bus current $I_{tad}$ | Measured external static pressure P (inch of $H_2O$) |
|---|---|---|---|
| 150.31 | 350 | 4 | 0.091 |
| 149.95 | 400 | 5 | 0.116 |
| 150.33 | 500 | 6 | 0.177 |
| 150.58 | 600 | 8 | 0.252 |
| 149.72 | 700 | 14 | 0.343 |
| 150.63 | 800 | 23 | 0.457 |
| 150.12 | 900 | 33 | 0.584 |
| 150.83 | 1000 | 46 | 0.722 |
| 150.11 | 1100 | 62 | 0.883 |
| 150.65 | 1200 | 80 | 1.074 |
| 300 | 500 | | 0.1 |
| 300 | 600 | 18 | 0.227 |
| 300 | 700 | 27 | 0.31 |
| 300 | 800 | 40 | 0.418 |
| 300 | 900 | 53 | 0.537 |
| 300 | 1000 | 70 | 0.667 |
| 300 | 1100 | 88 | 0.819 |
| 304 | 1200 | 110 | 0.994 |
| 450 | 500 | 19 | 0.011 |
| 450 | 600 | 31 | 0.152 |
| 450 | 700 | 45 | 0.257 |
| 450 | 800 | 60 | 0.374 |
| 450 | 900 | 80 | 0.504 |
| 450 | 1000 | 102 | 0.609 |
| 450 | 1100 | 129 | 0.767 |
| 450 | 1200 | 157 | 0.927 |
| 450 | 1300 | 189 | 1.093 |
| 900 | 1020 | 222 | 0.106 |
| 900 | 1050 | 244 | 0.174 |
| 900 | 1100 | 285 | 0.36 |
| 900 | 1130 | 296 | 0.418 |
| 900 | 1200 | 336 | 0.614 |
| 900 | 1300 | 396 | 0.83 |

Curve Fitting:

The first curve: the function related to the target air volume Q=150 SCFM is $I_{tad}=27.83-10.89 \times n+1.274 \times n^2$.

The second curve: the function related to the target air volume Q=300 SCFM is $I_{tad}=38.6-12.7 \times n+1.577 \times n^2$.

The third curve: the function related to the target air volume Q=450 SCFM is $I_{tad}=12.17-6.023 \times n+1.509 \times n^2$.

The fourth curve: the function related to the target air volume Q=900 SCFM is $I_{tad}=-669.8+110 \times n-2.16 \times n^2$.

To prevent the motor from entering an ineffective rotational speed interval which otherwise prolongs the time for air volume regulation or even results in unstable air volume control, an effective rotational speed interval can be configured according to the original data. Taken the above original data of the load as an example, it can be configured that when Q1=150 SCFM, a minimum rotational speed $n_{min}$=350 RPM, and a maximum rotational speed $n_{max}$=1200 RPM; when Q2=900 SCFM, the minimum rotational speed $n_{min}$=1020 RPM, and the maximum rotational speed $n_{max}$=1200 RPM. The rotational speed of the motor can be only regulated within the configured range of the rotational speed, and once the upper limit or the lower limit is reached, the rotational speed is stayed at the upper or lower limit of the configured range for further determination until the target air volume is reached. The principle for selecting the effective rotational speed interval is to enable the effective rotational speed interval to cover the applied static pressure range. Because in condition of the air volume of 150 SCFM, it only requires the load to work at a static pressure of between 0.1 and 0.9 inch of the water column, thus the range of between 350 and 1200 RPM is selected as the effective rotational speed interval according to the original data.

1) The motor is started at a certain rotational speed (for example n=1000 RPM) after being energized. The starting rotational speed must ensure that the motor is able to fluently reach a stable state, thus the starting rotational speed cannot be too low (for example lower than 400 RPM) or too high (for example higher than 1300 RPM). A suitable starting rotational speed is selected according to the original data until the system reaches the rotational speed of 1000 RPM and enters a stable state.

2) Given that the target air volume $Q_{set}$ input from the external is equal to 150 CFM.

3) The function $I_{tad}=f(n)$ corresponding to $Q_{set}=150$ CFM is searched by the microprocessor, and the function of the calculated bus current is $I_{tad}=27.83-10.89 \times n+1.274 \times n^2$. The real-time bus current $I_{bus}$ is detected, when $I_{tad}-I_{bus}>0$, it is indicated that the actual air volume is small than the target air volume, then the rotational speed of the motor is increased; when $I_{tad}-I_{bus}<0$, it is indicated that the actual air volume is larger than the target air volume, then the rotational speed of the motor is decreased; and when $I_{tad}-I_{bus}=0$, it is indicated that the actual air volume reaches the target air volume, and it is not necessary to regulate the rotational speed of the motor. Before increasing or decreasing the practical rotational speed of the motor, it is firstly determined whether the next rotational speed is within the interval of between $n_{min}$ and $n_{max}$, when the rotational speed exceeds the interval, a critical rotational speed is adopted as the calculating basis. For example, when $I_{tad}-I_{bus}>0$, the rotational speed of the motor increases, but if the next rotational speed is larger than 1200 RPM, then the rotational speed of the motor is only regulated to be 1200 RPM, and step 3) is repeated until the system reaches the stable state.

When the output air volume changes due to the change of the external system, it only requires to repeat step 3).

Principle of the method for controlling the constant air volume of the invention is as follows: the function $I_{tad}=f(n)$ of the DC bus current related to each target air volume $Q_{set}$ is acquired by experimental means, and the calculated DC bus current $I_{tad}$ is obtained by the microprocessor according to the function $I_{tad}=f(n)$ and the corresponding target air volume $Q_{set}$. The real-time DC bus current $I_{bus}$ is detected, and the calculated DC bus current $I_{tad}$ and the real-time DC bus current $I_{bus}$ are compared for the close-loop control. The number of the control variables is small, the mathematical model is simple. It is not necessary to calculate or control a real-time torque of the motor, and the microprocessors, such as CPU and MCU, the computing capacity of which are not so high can be Adopted, therefore decreasing the cost of the product. In the meanwhile, the specific measurements by the closed-loop control and the experimental means are able to effectively ensure the accuracy of the control and to realize the small air volume control free from the limiting state of the minimum torque.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for controlling constant air volume of an electronically commutated motor in an heating, ventilating, and air conditioning system, the electronically commutated motor comprising: a stator assembly, a rotor assembly, and a motor controller; the motor controller comprising: a power circuit, a microprocessor, an inverter circuit, a rotor position detection circuit, and a bus current detection circuit; the electronically commutated motor driving the wind wheel; the power circuit supplying power to other circuits; the rotor position detection circuit detecting a rotor position signal and inputting the rotor position signal to the microprocessor; the microprocessor calculating a real-time rotational speed n according to the rotor position signal; the bus current detection circuit inputting a bus current to the microprocessor; the microprocessor controlling the inverter circuit; and the inverter circuit controlling an energization state of each coil winding of the stator assembly;

the method comprising:
- a) acquiring a target air volume $Q_{set}$ input from an external, determining a function $I_{tad}=f(n)$ corresponding to the input target air volume $Q_{set}$ by the microprocessor, in which, $I_{tad}$ represents a bus current, n represents a rotational speed of the motor, $n_{min} < n < n_{max}$, $n_{min}$ represents a minimum critical rotational speed of the function $I_{tad}=f(n)$ corresponding to the input target air volume, $n_{max}$ represents a maximum critical rotational speed of the function $I_{tad}=f(n)$ corresponding to the input target air volume; when the motor is in a halt state, operating the motor and acquiring an original rotational speed n of the motor by the microprocessor; and when the motor is in an operating state, acquiring a current rotational speed n of the motor by the microprocessor;
- b) acquiring a calculated bus current $I_{tad}$ according to the rotational speed n of the motor and the function $I_{tad}=f(n)$, and detecting a real-time bus current $I_{bus}$; and
- c) comparing the calculated bus current $I_{tad}$ with the real-time bus current $I_{bus}$ by the microprocessor for closed-loop control; when the calculated bus current $I_{tad}$ is larger than the real-time bus current $I_{bus}$, increasing the rotational speed n of the motor; when the calculated bus current $I_{tad}$ is smaller than the real-time bus current $I_{bus}$, decreasing the rotational speed n of the motor; and when the calculated bus current $I_{tad}$ is equal to the real-time bus current $I_{bus}$, stopping regulating the rotational speed n of the motor and allowing the electronically commutated motor to enter a working condition, and returning to B) for continuing the control of the constant air volume.

2. The method of claim 1, further comprising determining whether the rotational speed is within the range of between $n_{min}$ and $n_{max}$ before regulating the rotational speed of the motor in c), and employing a critical rotational speed as a next rotational speed and repeating b) and c) when the rotational speed is out of the range of between $n_{min}$ and $n_{max}$.

3. The method of claim 1, wherein "when the calculated bus current $I_{tad}$ is equal to the real-time bus current $I_{bus}$" means that an error of the real-time bus current $I_{bus}$ deviated from the calculated bus current $I_{tad}$ is within a certain range.

4. The method of claim 2, wherein "when the calculated bus current $I_{tad}$ is equal to the real-time bus current $I_{bus}$" means that an error of the real-time bus current $I_{bus}$ deviated from the calculated bus current $I_{tad}$ is within a certain range.

5. The method of claim 1, wherein the function $I_{tad}=f(n)$ is acquired as follows: for each target air volume, gradually increasing a static pressure within a range covering an actual static pressure range while allowing the motor to be in a constant rotational speed control; regulating a rotational speed of a back pressure fan in an air duct or an opening of an air door for ensuring the real-time air volume equal to the target air volume, and recording the rotational speed n of the motor in a stable state and the DC bus current $I_{tad}$ so that a group of the rotational speed n and the DC bus current $I_{tad}$ are obtained corresponding to each target air volume; and acquiring the function $I_{tad}=f(n)$ corresponding to each target air volume by curve fitting.

6. The method of claim 2, wherein the function $I_{tad}=f(n)$ is acquired as follows: for each target air volume, gradually increasing a static pressure within a range covering an actual static pressure range while allowing the motor to be in a constant rotational speed control; regulating a rotational speed of a back pressure fan in an air duct or an opening of an air door for ensuring the real-time air volume equal to the target air volume, and recording the rotational speed n of the motor in a stable state and the DC bus current $I_{tad}$ so that a group of the rotational speed n and the DC bus current $I_{tad}$ are obtained corresponding to each target air volume; and acquiring the function $I_{tad}=f(n)$ corresponding to each target air volume by curve fitting.

7. The method of claim 1, wherein
the function $I_{tad}=f(n)$ is a polynomial function: $I_{tad}=C_1+C_2 \times n + \ldots + C_m \times n^{m-1}$, in which $C_1, C_2, \ldots,$ and $C_m$ represent coefficients, n represents the rotational speed of the motor; each target air volume corresponds to one group of coefficients $C_1, C_2, \ldots,$ and $C_m$ and the corresponding coefficients are stored; and
one group of coefficients $C_1, C_2, \ldots,$ and $C_m$ are acquired by the microprocessor by a look-up table method according to the input target air volume $Q_{set}$, whereby acquiring the function $I_{tad}=f(n)$.

8. The method of claim 2, wherein
the function $I_{tad}=f(n)$ is a polynomial function: $I_{tad}=C_1+C_2 \times n + \ldots + C_m \times n^{m-1}$, in which $C_1, C_2, \ldots,$ and $C_m$ represent coefficients, n represents the rotational speed of the motor; each target air volume corresponds to one group of coefficients $C_1, C_2, \ldots,$ and $C_m$ and the corresponding coefficients are stored; and
one group of coefficients $C_1, C_2, \ldots,$ and $C_m$ are acquired by the microprocessor by a look-up table method according to the input target air volume $Q_{set}$, whereby acquiring the function $I_{tad}=f(n)$.

9. The method of claim 1, wherein
in acquiring the target air volume $Q_{set}$ input from the external in a), when the motor is in the halt state, the original rotational speed n of the motor is an intermediate value in a normal rotational speed range of the motor.

10. The method of claim 2, wherein
in acquiring the target air volume $Q_{set}$ input from the external in a), when the motor is in the halt state, the original rotational speed n of the motor is an intermediate value in a normal rotational speed range of the motor.

11. The method of claim 1, wherein
each target air volume $Q_{set}$ input from the external corresponds to a certain range of a duty ratio of a PWM signal input from the external, a relay signal, a digital communication signal, or a signal similar to a 0-10 VAC analog signal.

12. The method of claim 2, wherein
each target air volume $Q_{set}$ input from the external corresponds to a certain range of a duty ratio of a PWM signal input from the external, a relay signal, a digital communication signal, or a signal similar to a 0-10 VAC analog signal.

13. The method of claim 1, wherein
increasing or decreasing the rotational speed n of the motor is realized by increasing or decreasing a duty ratio of a PWM signal input into the inverter circuit by the microprocessor.

14. The method of claim 2, wherein
increasing or decreasing the rotational speed n of the motor is realized by increasing or decreasing a duty ratio of a PWM signal input into the inverter circuit by the microprocessor.

15. The method of claim 11, wherein
the microprocessor is stored with four grades of air volumes corresponding to four functions $I_{tad}=f(n)$;
a first target air volume Q1, a second target air volume Q2, a third target air volume Q3, and a fourth target air volume Q4 respectively correspond to a lower air volume control, a middle lower air volume control, a middle air volume control, and a higher air volume control;
the signal of the target air volume $Q_{set}$ input from the external is the PWM signal;
the first target air volume Q1 is selected when the duty ratio of the PWM signal is between 1% and 25%;
the second target air volume Q2 is selected when the duty ratio of the PWM signal is between 26% and 50%;
the third target air volume Q3 is selected when the duty ratio of the PWM signal is between 51% and 75%; and
the fourth target air volume Q4 is selected when the duty ratio of the PWM signal is between 76% and 99%.

16. The method of claim 12, wherein
the microprocessor is stored with four grades of air volumes corresponding to four functions $I_{tad}=f(n)$;
a first target air volume Q1, a second target air volume Q2, a third target air volume Q3, and a fourth target air volume Q4 respectively correspond to a lower air volume control, a middle lower air volume control, a middle air volume control, and a higher air volume control;
the signal of the target air volume $Q_{set}$ input from the external is the PWM signal;
the first target air volume Q1 is selected when the duty ratio of the PWM signal is between 1% and 25%;
the second target air volume Q2 is selected when the duty ratio of the PWM signal is between 26% and 50%;
the third target air volume Q3 is selected when the duty ratio of the PWM signal is between 51% and 75%; and
the fourth target air volume Q4 is selected when the duty ratio of the PWM signal is between 76% and 99%.

17. The method of claim 3, wherein the error is within a certain range means that a deviation is ±3%.

18. The method of claim 4, wherein the error is within a certain range means that a deviation is ±3%.

* * * * *